(12) United States Patent
He et al.

(10) Patent No.: US 12,099,190 B2
(45) Date of Patent: Sep. 24, 2024

(54) WAVEGUIDE WITH POLARIZATION VOLUME HOLOGRAM GRATING

(71) Applicant: Meta Platforms Technologies, LLC, Menlo Park, CA (US)

(72) Inventors: Sihui He, Sunnyvale, CA (US); Maxwell Parsons, Seattle, WA (US); Fenglin Peng, Redmond, WA (US); Miaomiao Xu, Redmond, WA (US); Yang Yang, Redmond, WA (US); Yu Shi, Redmond, WA (US); Dianmin Lin, Los Altos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/549,394

(22) Filed: Dec. 13, 2021

(65) Prior Publication Data
US 2023/0185091 A1    Jun. 15, 2023

(51) Int. Cl.
| | | |
|---|---|---|
| *G02B 27/01* | (2006.01) | |
| *G02B 5/18* | (2006.01) | |
| *G02B 5/32* | (2006.01) | |
| *G02B 6/42* | (2006.01) | |
| *G02B 27/00* | (2006.01) | |
| *F21V 8/00* | (2006.01) | |

(52) U.S. Cl.
CPC ....... *G02B 27/0172* (2013.01); *G02B 5/1842* (2013.01); *G02B 5/32* (2013.01); *G02B 6/4206* (2013.01); *G02B 6/4213* (2013.01); *G02B 27/0081* (2013.01); *G02B 6/0018* (2013.01); *G02B 6/0036* (2013.01); *G02B 2027/0174* (2013.01); *G02B 2027/0178* (2013.01)

(58) Field of Classification Search
CPC .. G02B 6/4206; G02B 6/4213; G02B 5/1842; G02B 5/32; G02B 27/0172; G02B 2027/0174; G02B 2027/0178
See application file for complete search history.

(56) References Cited

U.S. PATENT DOCUMENTS

| | | | | |
|---|---|---|---|---|
| 6,104,454 | A * | 8/2000 | Hiyama | G02B 6/0028 349/96 |
| 10,222,620 | B2 * | 3/2019 | Bohn | G02B 27/0081 |
| 2019/0317450 | A1 * | 10/2019 | Yaroshchuk | G03H 1/02 |
| 2020/0271936 | A1 * | 8/2020 | Leibovici | G03H 1/0244 |
| 2020/0371280 | A1 | 11/2020 | Geng et al. | |

(Continued)

FOREIGN PATENT DOCUMENTS

WO    WO-2019104046 A1 *   5/2019   ............. G02B 27/01

OTHER PUBLICATIONS

International Search Report and Written Opinion for International Application No. PCT/US2022/052475, dated Apr. 18, 2023, 8 pages.

(Continued)

*Primary Examiner* — Daniel Petkovsek
(74) *Attorney, Agent, or Firm* — Greenberg Traurig, LLP

(57) ABSTRACT

A waveguide is provided. The waveguide includes a substrate having two outer surfaces for propagating a beam of light in the substrate by reflecting the beam from the two outer surfaces. The waveguide includes at least one polarization volume hologram (PVH) grating to couple light in and/or out of the waveguide. The PVH grating may be a multi-layer PVH grating with graded birefringence.

17 Claims, 10 Drawing Sheets

(56) References Cited

U.S. PATENT DOCUMENTS

2021/0191122 A1    6/2021  Yaroshchuk et al.
2022/0236570 A1*  7/2022  Lee ..................... G02B 5/1842

OTHER PUBLICATIONS

International Preliminary Report on Patentability for International Application No. PCT/US2022/052475, mailed Jun. 27, 2024, 7 pages.

* cited by examiner

WAVEGUIDE WITH POLARIZATION VOLUME HOLOGRAM GRATING

TECHNICAL FIELD

The present disclosure relates to optical components, and in particular to waveguides usable in wearable displays.

BACKGROUND

Head-mounted displays (HMDs), near-eye displays (NEDs), and other wearable display systems can be used to present virtual scenery to a user, or to augment real scenery with dynamic information, data, or virtual objects. The virtual or augmented scenery can be three-dimensional (3D) to enhance the experience and to match virtual objects to real objects observed by the user. Eye position and gaze direction, and/or orientation of the user may be tracked in real time, and the displayed scenery may be dynamically adjusted depending on the user's head orientation and gaze direction, to provide a better experience of immersion into a simulated or augmented environment.

Lightweight and compact near-eye displays reduce strain on the user's head and neck, and are generally more comfortable to wear. The optics block of such displays can be the heaviest part of the entire system. Compact planar optical components, such as waveguides, gratings, Fresnel lenses, etc., may be employed to reduce size and weight of an optics block. However, compact planar optics may have limitations related to image quality, output pupil size and uniformity, pupil swim, field of view of the generated imagery, visual artifacts, etc.

BRIEF DESCRIPTION OF THE DRAWINGS

Example embodiments will now be described in conjunction with the drawings, which are not to scale, in which like elements are indicated with like reference numerals, and in which.

DETAILED DESCRIPTION

Figure 1A:
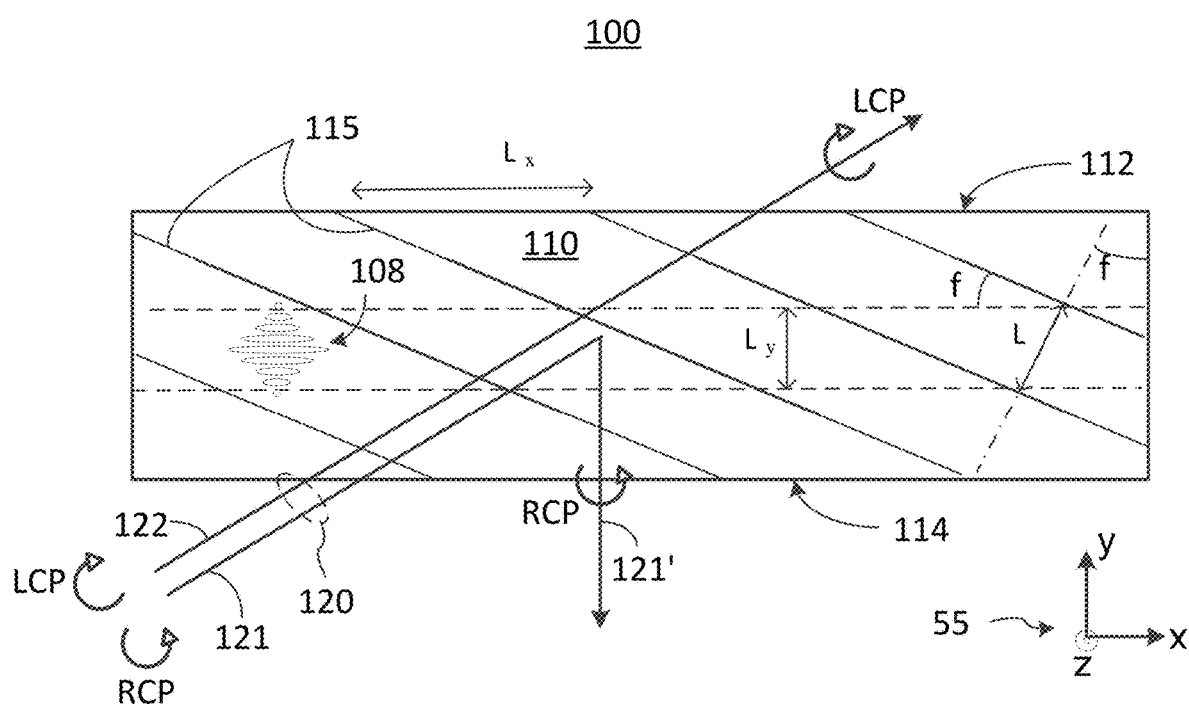
FIG. 1A is a schematic side cross-sectional view of a polarization volume hologram (PVH) grating.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Reference throughout this specification to "one embodiment" or "an embodiment" means that a particular feature, structures, or characteristics may be combined in any suitable manner in one or more embodiments.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

An optical waveguide may be used in a display system, such as but not exclusively a near-eye display (NED), to illuminate a transmissive or reflective display panel with an expanded beam of light. An input beam of light may be coupled into the optical waveguide by a suitable input coupler, which may be relatively small in area, and then may be coupled out of the optical waveguide using an output coupler, which may extend across a comparatively larger output region of the waveguide to provide the expanded beam. A high degree of flatness and parallelism of waveguide surfaces may be desired to provide uniform illumination. The display panel may spatially and temporally modulate the illumination light to provide image light carrying an image. A reflective display panel may reflect the image light back towards the output waveguide for propagating therethrough, e.g. toward a viewing area, which may be at the other side of the optical waveguide from the display panel. A polarization volume hologram (PVH) grating disposed in the output region, e.g. a multi-layer graded-birefringence PVH grating, may be used as a polarization-selective output coupler to diffract the in-coupled light of a first polarization out of the waveguide to illuminate the display panel, while allowing the image light reflected from the display panel in a second polarization to pass therethrough toward the viewing area, e.g. toward an eyebox in a NED implementation. Herein the term "eyebox" means a geometrical area for the user's eye where a good-quality image may be observed by a user of the NED. The term "graded-birefringence" refers to a structure or element having portions, e.g. layers, of different birefringence, the birefringence typically being lower near a surface of the structure than away from the surface.

Embodiments described herein relate to an optical waveguide comprising a substrate of optically transparent material, the substrate comprising two opposing outer surfaces for guiding a beam of light in the substrate by reflections therefrom; and a PVH disposed in or upon the substrate, and configured to transmit therethrough light of a first polarization while diffracting light of a second, orthogonal polarization; the PVH is further configured to diffract out of the substrate a portion of the beam having the second polarization.

In some implementations, the first and second polarizations may be circular polarizations of opposite handedness.

In some implementations, the substrate may further comprise an input region for coupling the beam into the substrate, and an output region at a distance from the input region for coupling the beam out of the substrate to form an output beam, with the PVH disposed in at least one of the input or output regions.

In some implementations, the PVH is disposed in the output region.

In any of the above implementations, the PVH may comprise a stack of PVH layers, at least one PVH layer of the stack comprising a periodic sequence of helically-birefringent fringes; adjacent PVH layers of the stack may have different birefringence. The stack of PVH layers may comprise e.g. a first PVH layer between second and third PVH layers, the first PVH layer having a higher birefringence than the second and third PVH layers.

In any of the above implementations, an anti-reflection (AR) coating may be provided at an interface between the PVH grating and the substrate.

In any of the above implementations, the PVH may extend across the output region along the two opposing outer surfaces. The PVH may further be configured to have an increasing diffraction efficiency in a direction of propagation of the beam across the output region.

In any of the above implementations, the optical waveguide may comprise at least one of: a folding grating disposed in the substrate in an optical path of the beam from the input region to the output region, a beam splitter disposed in the substrate in the optical path of the beam, and an a-plate retarder disposed in the substrate in an optical path of the beam.

A further aspect of the present relates to a display apparatus comprising: a display panel, and an illuminator for the display panel, the illuminator comprising: a light source for emitting a beam of light, and an optical waveguide for relaying the beam to illuminate the display panel. The optical waveguide comprises a substrate of optically transparent material, the substrate comprising an input region for coupling the beam into the substrate, and an output region at a distance from the input region for coupling the beam out of the substrate to form an output beam. The optical waveguide further comprises two opposing outer surfaces for guiding the beam in the substrate by reflections therefrom, and a first PVH disposed in at least one of the output region or the input region of the substrate, the first PVH comprising a periodic sequence of helically birefringent fringes and configured to diffract light having a first polarization while transmitting therethrough light of a second, orthogonal polarization.

In some implementations of the display apparatus, the first PVH may extend along the outer surfaces in the output region to diffract out of the substrate, as output light, a portion of the beam incident thereon having the first polarization; the first PVH may comprise a stack of PVH layers, each PVH layer of the stack comprising a periodic sequence of helically birefringent fringes, the stack comprising a middle PVH layer between two outer PVH layers, the middle PVH layer having a greater birefringence than the outer PVH layers; the first and second polarizations may be circular polarizations of opposite handedness.

In some implementations, the display apparatus may further comprise a projection lens disposed opposite the display panel with the output region of the optical waveguide therebetween; the display panel may be configured to reflect at least a portion of the output light toward the projection lens as image light; the first PVH may be configured to transmit therethrough the image light to propagate to the projection lens.

In any of the above implementations, the display apparatus may comprise a steering reflector configured to direct the beam from the light source toward the input region at a variable angle of incidence.

In any of the above implementations, the display apparatus may comprise a second PVH configured to transmit light of one of the first and second polarizations and to diffract light of the other of the first and second polarizations, the second PVH being disposed in the input region between the light source and the steering reflector; the light source may be configured to emit circularly polarized light of the one of the first and second polarizations.

A further aspect of the present relates to a method for illuminating a display panel, the method comprising: using an optical waveguide to propagate a beam of light toward the display panel, and using a PVH comprising a periodic array of helically birefringent fringes and configured to diffract incident light of a first polarization while transmitting incident light of a second, orthogonal polarization, to perform at least one of: coupling the beam into the optical waveguide or out of the optical waveguide.

In some implementations, the method may comprise using a birefringence-graded stack of PVH layers in the PVH. The stack may comprise an inner PVH layer between two outer PVH layers of lower birefringence, to lessen leakage of light of the first polarization through the PVH.

In some implementations, the method may comprise using a first PVH in an input region of the optical waveguide to transmit circularly polarized light therethrough from an optical source to a steering reflector, and using a second, graded-birefringence PVH disposed in an output region of the optical waveguide to diffract light out of the waveguide toward a reflective display panel, and to transmit light reflected from the reflective display panel toward a projection lens disposed opposite the reflective display panel.

Referring to FIG. 1A, a polarization volume hologram (PVH) grating 100 is a polarization-selective optical element formed in a layer 110 of a birefringent material. The PVH grating 100 may be configured to diffract, e.g. in a first diffraction order, light 121 of a first polarization, while allowing light 122 of a second, orthogonal polarization to be transmitted therethrough along the direction of incidence. In various embodiments, PVH grating 100 may be configured to selectively effect a periodic spatial modulation of an effective refractive index $n_{eff}$ of the PVH medium for light of the first polarization, e.g. forming a periodic sequence of refractive planes 115 of constant refractive index spaced by a period $\Lambda$. The birefringent material of the PVH grating 100 may be bound between two opposing surfaces 112 and 114, which in some embodiments may be parallel. The refractive planes 115, also termed Bragg planes, may be tilted with a tilt angle ϕ relative to the surfaces 112, 114. In example embodiments described below, the first and second polarizations may be circular polarizations of opposite handedness. For example, the PVH grating 100 may be configured to transmit right circular polarized (RCP) light while diffracting back left circular polarized (LCP) light, or vice versa.

In the following, reference is made to a Cartesian coordinate system (x,y,z) 55 having the (x,z) plane parallel to the outer surfaces 112, 114 of the PVH grating, with the y-axis pointing in the direction of the layer's thickness, which may also be referred to as the vertical direction.

The birefringent material of the layer 110 may exhibit a birefringence $\Delta n=|n_o-n_e|$. The ordinary and extraordinary refractive indices, $n_o$ and $n_e$, respectively, of the material of layer 110 are defined relative to an optic axis in the material. In some embodiments the birefringent material of the layer 110 may exhibit helical symmetry, with helical structures 108 having a helical twist period of $\Lambda_y$ along the y-axis, where one period corresponds to a rotation of the optic axis in the (x,z) plane by 180°. The birefringent material of the layer 110 may further be prepared so that the rotation angle of the optic axis changes continuously, e.g. linearly, along the x-axis with a period of Λ. This results in the series of slanted and periodically spaced refractive index planes 115 having uniform optic axis orientation, with the tilt angle $\phi=\arctan(\Lambda_y/\Lambda_x)$, which are spaced by $\Lambda=\Lambda_B=\Lambda_x\cdot\sin(\phi)=\Lambda_y\cdot\cos(\phi)$. When the PVH grating 100 is thick enough so that incident light 121 intersects a sufficient number of the index planes 115, Bragg diffraction can be established.

In such embodiments, the first and second polarizations may be circular polarizations of opposite handedness. When the handedness of circularly polarized light, e.g., light 121, impinging on the PVH grating 100 corresponds to the handedness of the optic axis rotation along the direction of incidence, e.g. corresponds to the helical twist direction of the helical structures 108 in the layer 110, the helically twisted structures 108 in the PVH grating 100 interact with the light to modulate its phase. The PVH grating 100 thus diffracts circularly polarized light 121 of the same handedness, but transmits, substantially without diffraction, circularly polarized light 122 which polarization twists in the direction opposite to that of the helical structures of the PVH grating. Herein, the term "substantially without diffraction" means that, even though an insignificant portion of the beam might diffract, the portion of the diffracted light energy is so small that it does not impact the intended performance of the PVH grating 100. In some embodiment, the fraction of the LCP light energy being diffracted is at least 10 times, or at least 20 times, or at least 100 times smaller than the fraction of the RCP light energy being diffracted. In contrast to a conventional reflector, the PVH grating 100 may be configured so that the reflection does not changes the handedness of the circularly polarized light being reflected. For example, the PVH grating 100 reflects RCP light 121 and transmits LCP light 122 without changing their respective polarizations.

Figure 1B:
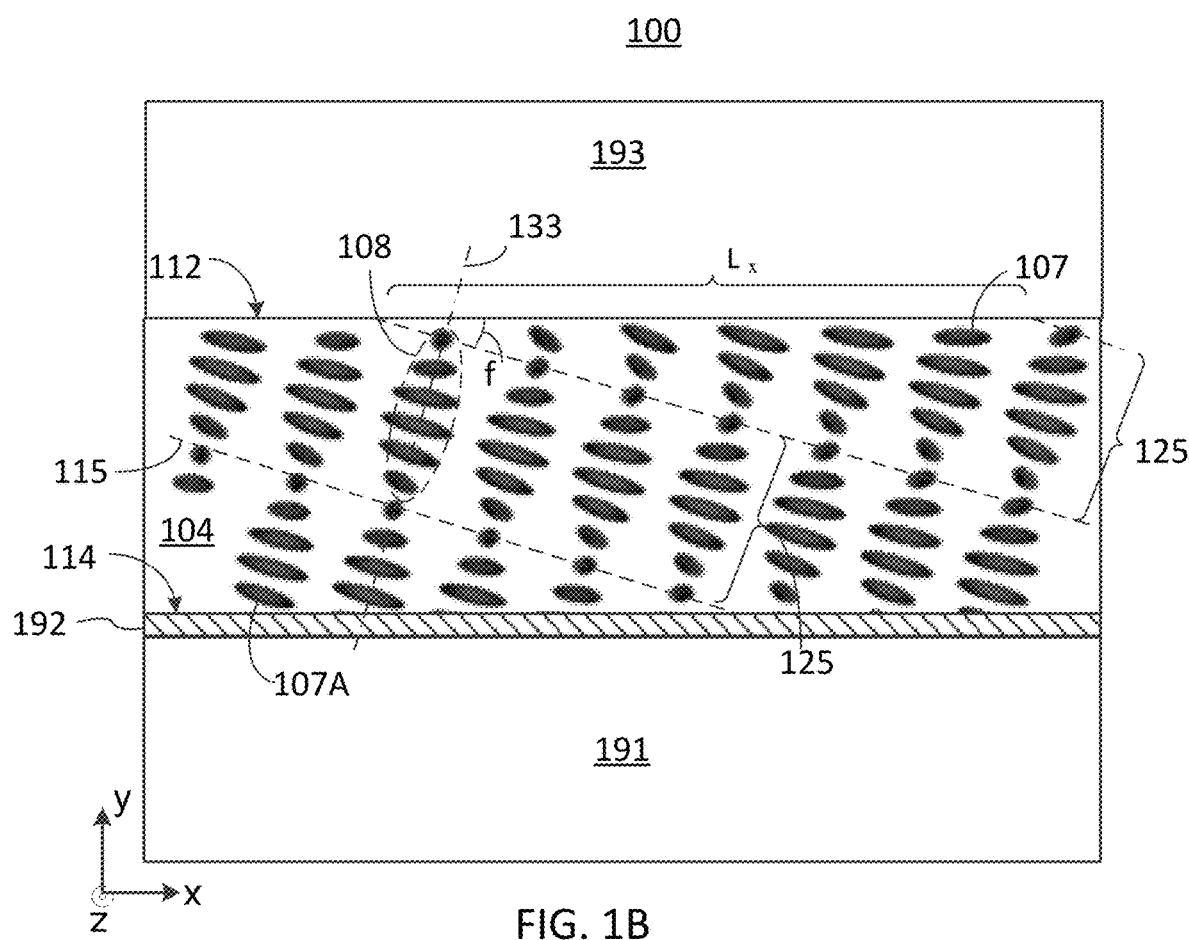
FIG. 1B is a schematic side cross-sectional view of a liquid crystal (LC) implementation of the PVH grating of FIG. 1A.

Referring to FIG. 1B, the PVH grating 100 may include an LC layer 104 disposed over a substrate layer 191 and bound by opposed top 112 and bottom 114 parallel surfaces. Optionally, a second substrate layer 193 may be disposed over the LC layer 104. The LC layer 104 may include an LC fluid containing rod-like LC molecules 107 with positive dielectric anisotropy, e.g. nematic LC molecules. A chiral dopant may be added to the LC fluid, causing the LC molecules in the LC fluid to self-organize into a periodic helically twisted configuration including helical structures 108 extending between the top 112 and bottom 114 parallel surfaces of the LC layer 104. The helical twist axes 133 of the helical structures 108 may tilt. Such a configuration may be produced, e.g. using a thin photo-alignment layer 192 spin-coated over the substrate layer 190, which is subsequently exposed to polarized UV light to create a desired alignment pattern in the phot-alignment layer 192, so as to cause LC molecules 107A adjacent the photo-alignment layer 192 to align in a periodically rotated pattern, with the azimuthal rotation angle linearly varying along the x-axis. A high-twist LC can be then spin-coated over the photo-alignment layer 192. The periodic surface alignment pattern may be induced in the photo-alignment layer 192 by various methods, e.g. by exposing the photo-alignment layer 192 to interference patterns of a left- and right-handed circularly polarized UV beams. The periodicity $\Lambda_y$ of the helical structure along the y-axis can be adjusted via controlling the helical twist power and concentration of a chiral dopant. Adjacent LC molecules 107 adopt helical patterns extending from the top 112 to the bottom 114 surfaces of the LC layer 104, as shown.

The helical structures 108 form a volume grating comprising a periodic sequence of helically-birefringent fringes 125 tilted at a tilt angle ϕ. Within each helically-birefringent fringe 125, the LC director and the optic axis rotate by 180°, defining the Bragg period Λ. A plurality of helical periods p=2Λ, e.g. at least two, at least five, or at least ten helical periods p between the top 112 and bottom 114 parallel surfaces of the LC layer 104. The steepness of the tilt angle ϕ may depend on the rate of variation of the azimuthal angle of the boundary LC molecules 107A at the bottom surface 114. Thus, the tilt angle ϕ may be controlled by the surface alignment pattern of the boundary LC molecules 107A at the alignment layer 192. In some embodiments, the helical structures 108 of the LC molecules 107 may be polymer-stabilized by mixing in a stabilizing polymer into the LC fluid and curing (polymerizing) the stabilizing polymer.

The helically-birefringent nature of the fringes 125 of the volume grating makes the PVH grating 100 preferentially responsive to light of polarization having one particular handedness, e.g. left- or right-circular polarization, while being substantially non-responsive to light of the opposite handedness of polarization. Thus, the helically birefringent fringes 125 make the PVH grating 100 polarization-selective. The polarization selectivity of the PVH grating 100 results from the effective refractive index of the grating being dependent on the relationship between the handedness, or chirality, of the impinging light beam and the handedness, or chirality, of the grating fringes 125. It is further noted that the sensitivity of the PVH grating 100 to right circular polarized light in particular is only meant as an illustrative example. When handedness of the helical fringes 125 is reversed, the PVH grating 100 may be made sensitive to left circular polarized light.

Embodiments described below relate to optical waveguides utilizing one or more PVH gratings to relay an expanded beam of light to illuminate a reflective display panel, and display apparatuses including such waveguides that utilize the polarization selectivity of PVH gratings to perform various light processing functions.

Figure 2A:
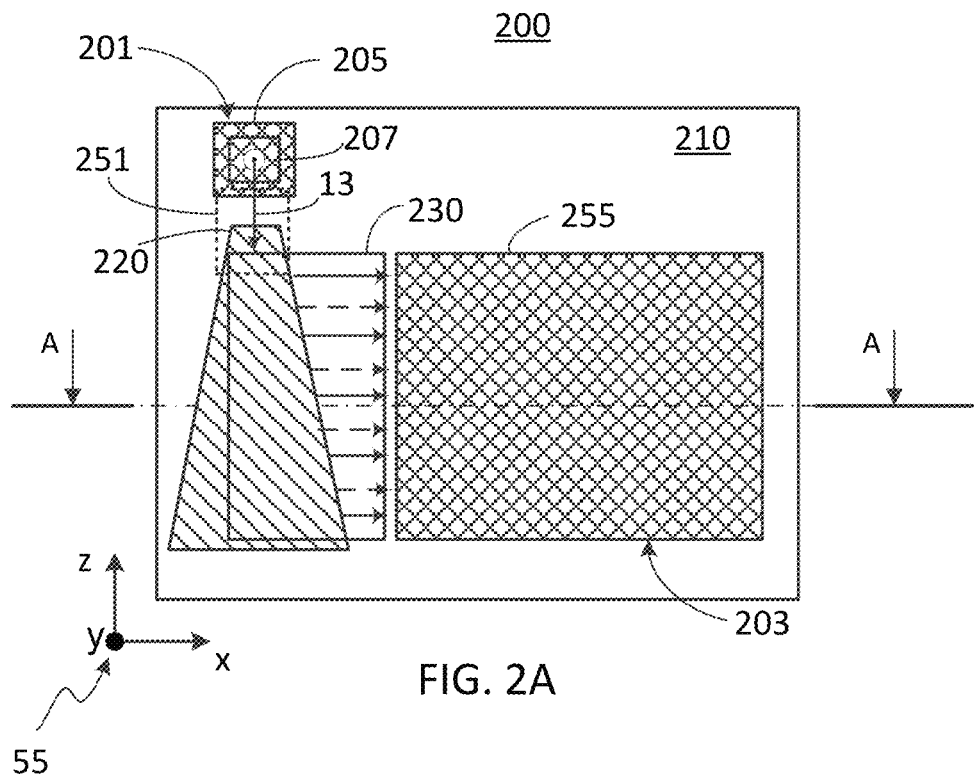
FIG. 2A is a schematic plan view of an optical waveguide incorporating a PVH grating.
Figure 2B:
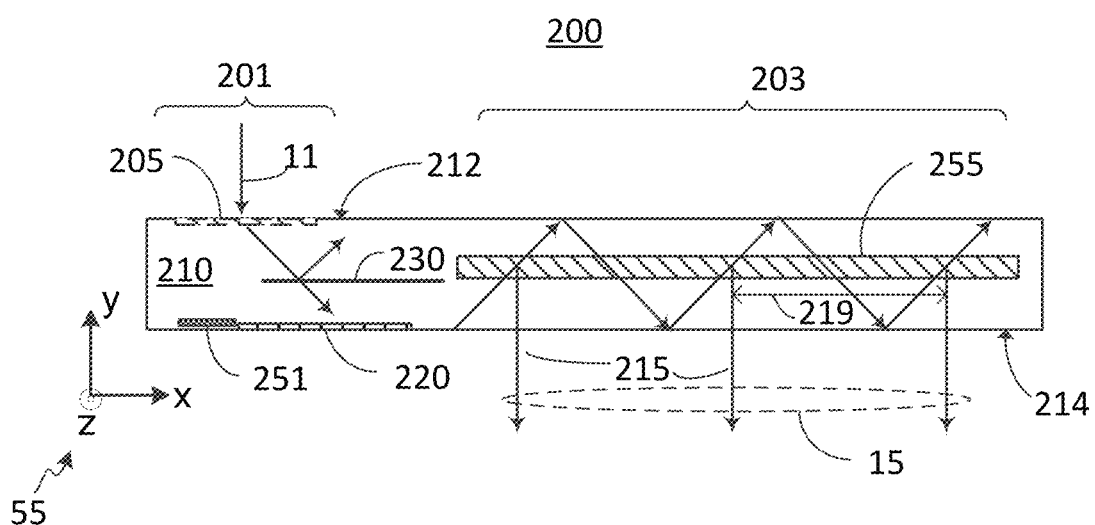
FIG. 2B is a schematic side cross-sectional view of the optical waveguide of FIG. 2A.

FIGS. 2A and 2B schematically illustrate, in plan and side views respectively, an example optical waveguide 200 including one or more PVH gratings for coupling light in and/or out of the waveguide. The waveguide 200 is configured to expand, or replicate, an input beam 11 along two different directions, providing an expanded output beam 15. In the examples described below these two directions are considered to be generally orthogonal, and thus may be described as aligned with the x- and z-axes of the Cartesian coordinate system (x,y,z) 555, although their orthogonality is not a requirement. The waveguide 200 includes a substrate 210 having a light input region 201, a light output region 203, and two opposing outer surfaces 212, 214 configured for propagating the beam 11 in the substrate 210 by reflecting the beam 11 from the surfaces 212, 214. In the description below the substrate 210 is considered to be planar, so that the propagation of light therein may be conveniently described relative to a same "global" coordinate system 55, which y-axis is perpendicular to the plane of the substrate. The substrate 210 may however have a curvature, for example to accommodate a human face, in which case the coordinate system 55 may be viewed as local to a region of the substrate being described, with its y-axis normal to the outer surfaces 212, 214 at the location being described. Thus, the term "plane of the substrate" may be understood as pertaining to a particular location or region of the substrate being described, and referring to a plane that can be viewed as locally parallel to the outer surfaces 212, 214 (the "(x, z) plane").

The input region 201 may have an area at least equal to an input pupil of the waveguide, e.g. input pupil 207 illustrated in FIG. 2A. In some embodiments, the input pupil may be defined by an area of the input region 201 illuminated by the beam 11 impinging thereupon. In some embodiments, the beam 11 may be steered in angular domain, possibly but not necessarily across the input area 201, to form a steered pupil. The beam 11, schematically shown with solid arrows, is in-coupled into the substrate 210 by an input coupler 205 at an angle or angles exceeding a critical angle of total internal reflection (TIR) upon the surfaces 212 and 214, to cause the beam 11 propagate within the substrate 210 in a vertical zigzag pattern, bouncing off the surfaces 212 and 214 by TIR with a bounce period 219. Accordingly, the surfaces 214, 212 may also be referred to as the TIR surfaces of the substrate. In the context of this specification, "vertical" relates to a plane or direction normal to the opposing outer surfaces of TIR in a waveguide substrate. Light of the input beam 11 coupled into the substrate 510 may be referred to as the in-coupled light (beam). The portion of the beam 11 coupled into the substrate 210 and propagating therein by TIR may be referred to as the in-coupled beam 13 or the in-coupled light 13.

The input coupler 205 may be, for example, a diffraction grating or gratings extending across the input region 201 along one of the outer surfaces, e.g. 212, or a prism coupler. In some embodiments the input coupler 205 may be a PVH grating that may be selective with respect to the handedness of circular polarization of light incident thereon, as described above. The output region 203 may include an output coupler 255 configured for directing offset beam portions 215 of the beam 11 out of the substrate 210 at consecutive incidences, thereby forming an expanded output beam of light 15. The output coupler 255 may be embodied, for example, with one or more diffraction gratings extending across the output region 203 along the outer surfaces 212 and 214.

In example embodiments described below, the output coupler 255 is a PVH grating that may be selective with respect to the handedness of circular polarization of light incident thereon, as described above, and may be positioned at one or both of the outer surfaces 212 and 214, or between the outer surfaces 212 and 214. The PVH grating diffracts multiple laterally offset parallel beam portions 215, which may be substantially lower-intensity copies or replicas of the beam 11, out of the waveguide to illuminate an expanded output pupil. The term "laterally offset", and derivatives thereof, is used herein to refer to a spatial offset between adjacent co-propagating beams in a plane normal to the general direction of their propagation in the plane of the waveguide. In FIG. 2A the beam portions 215 are illustrated for rays of the input light beam 11 of a particular wavelength that impinge upon the waveguide at normal incidence. The offset between them, which may be equal to the TIR bounce distance 219, or a fraction thereof in the presence of a beam splitter, may be greater or smaller for rays of non-normal incidence or of a different wavelength, with their direction generally corresponding to the direction of incidence of the beam 11 at the waveguide's input.

As illustrated in FIG. 2A, the output region 203 may be offset from the input region 201 along each of the two directions, i.e. the x-axis and the z-axis. A folding grating 220 is disposed to receive the in-coupled light 13 from the input coupler 205 and to re-direct it toward the output coupler 255. The folding grating 220 may be configured to cooperate with the output coupler 255 for beam expansion and pupil replication along the x- and z-axes directions.

The substrate 210 may further include a beam splitter 230 to split the in-coupled beam in the vertical plane (y, x) to more uniformly spread the in-coupled light across the output region and to increase the pupil replication density. The beam splitter 230 may be for example a partially reflecting surface or layer extending between the opposing outer surfaces 212 and 214, generally in parallel thereto. The beam splitter 230 may be located in the path of the in-coupled light 13 upstream of the output region 503.

In some embodiments the substrate 210 may further include a polarization converter 251, such as an a-plate retarder. This polarization converter 251 is schematically illustrated in FIGS. 2A and 2B upstream of the output region 203 between the input coupler 205 and the folding grating 220, but in some embodiments may be located at least in part in the output region 203. The polarization converter 251 may be configured to adjust, e.g. rotate, the polarization of the in-coupled beam to improve uniformity of light coupled out of the substrate by the output coupler 255.

In the illustrated embodiment, the input coupler 205 is configured to direct the in-coupled light beam 13 to propagate along the first direction in the plane of the substrate, e.g. along the z-axis, toward the folding grating 220. The folding grating 220 may be aligned with the input coupler 205 in the first direction, and is configured to re-direct the in-coupled light beam 13 to propagate along the second direction (x-axis) toward the output region 503. The folding grating 520 may be a suitably configured diffraction grating or gratings having a length in the first direction (z-axis) corresponding to a width of an output pupil of the waveguide 200 in that direction, and sufficient to split the in-coupled light beam 13 into multiple laterally offset sub-beams, as illustrated in FIG. 2A by a sequence of parallel solid arrows. In embodiments where the beam splitter 230 extends into a region of the substrate upstream of the folding grating 220, and/or overlaps with the folding grating 220, the beam splitter 230 may cooperate with the folding grating 220 to form additional split-off folded sub-beams, which are illustrated in FIG. 5A with dotted arrows, thereby increasing the beam replication density and in-coupled light uniformity along the first direction (z-axis).

Figure 3:
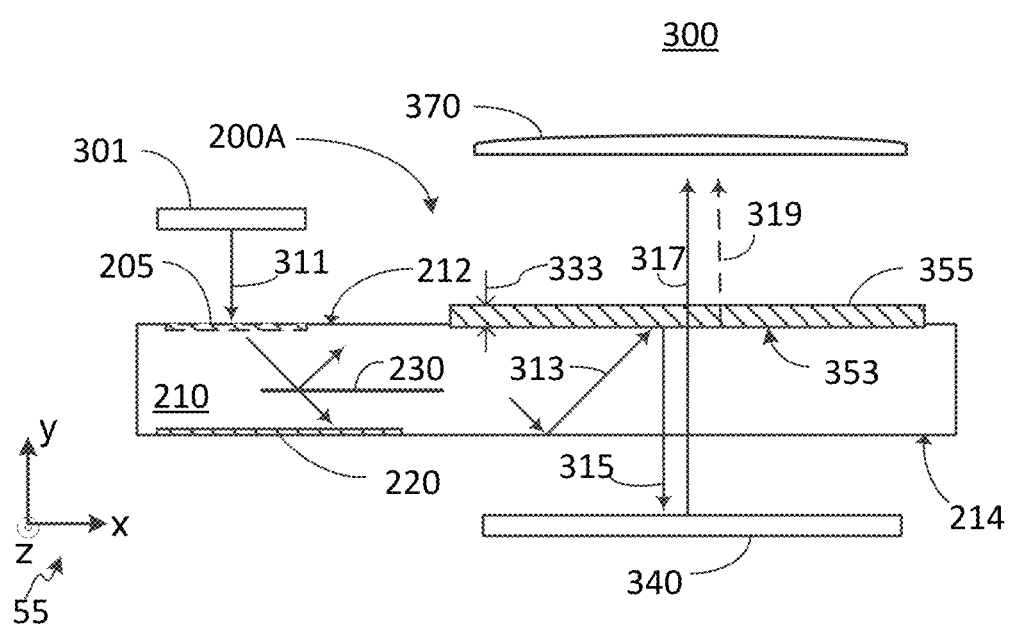
FIG. 3 is a schematic side view of a display apparatus using a PVH grating in an output region of an optical waveguide for illuminating a reflective display panel.
Figure 4:
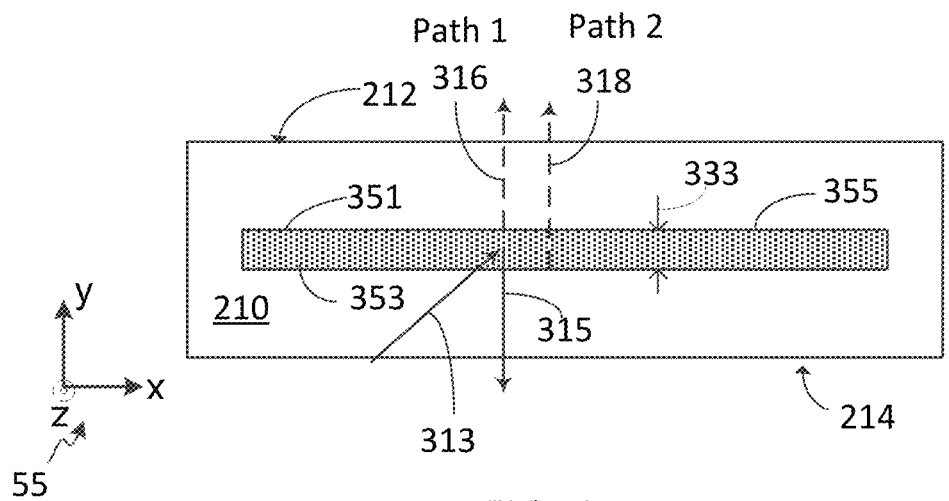
FIG. 4 is a schematic side cross-sectional view of an output portion of an optical waveguide illustrating two contributions to optical leakage from a PVH grating.

FIG. 3 schematically illustrates, in a side cross-sectional view, a display apparatus 300 utilizing an optical waveguide 200A to illuminate a reflective display panel 340. The optical waveguide 200A may be an embodiment of the optical waveguide 200 described above, in which a PVH grating 355, embodying the output coupler 255, is disposed at one of the outer surfaces of the substrate 210, e.g. the top surface 212. The PVH grating 355 may also be between the outer surfaces 212, 214 and spaced therefrom, as illustrated in FIG. 2B and FIG. 4. Similarly to the optical waveguide 200, the optical waveguide 200A may also incorporate a polarization converter (not shown), such as e.g. the a-plate retarder 251 of FIG. 2A. Elements of the waveguide 200A that are functionally same or similar to corresponding elements of the waveguide 200 are labeled with the same reference numerals, and will not be described again.

The display apparatus 300 includes the reflective display panel 340, and may further include a projection lens 370. In a NED implementation, the projection lens 370 may function as an ocular lens. The display panel 340 incorporates a reflective pixel array facing the output region of the waveguide where the PVH grating 355 is located. The display panel 340 may be, for example, a reflective active-matrix LCOS (liquid crystal on silicon) display panel using a liquid-crystal (LC) layer on top of a silicon backplane, or a DLP (digital light processing) panel having a 2D array of tiltable micro-mirrors.

An optical source 301 is configured to provide an input beam 311 of illumination light. In some embodiments, the input beam 311 may be linearly polarized. In some embodiments, the input beam 311 may be circularly polarized to have a first circular polarization, e.g. right circular polarization. The input beam 311 is coupled into the waveguide 200A by the input coupler 205, and propagates toward the output PVH grating 355, generally as described above with reference to waveguide 200. The polarization of the in-coupled beam 313 may change, e.g. when passing through the polarization converter 251 (not shown), upon reflections from the outer surfaces 212 and 214 and the beam splitter 230, and possibly while transmitting in the PVH grating 355. In some embodiments, the polarization of the in-coupled beam 313 may be made to be approximately linear, or generally elliptical, polarization as the beam approaches the output region of the waveguide 200A. After a number of reflections upon the outer surfaces 212, 214 and, possibly, the beam splitter 230, the in-coupled beam 313 impinges upon the output PVH grating 355 in a polarization state that may be a mixture of the first and second circular polarization states, e.g. the RCP and LCP. The output PVH grating 355 may be configured e.g. to transmit light of the first polarization state, e.g. RCP light, and to diffract light of the second circular polarization, e.g. LCP light. The output PVH grating 355 may further be configured to diffract the LCP component of the in-coupling beam 313 incident thereon out of the substrate 210 and toward the reflective display panel 340, in some embodiments in a direction parallel to the direction of incidence of the input beam 311. In some embodiments, the output beam 315 diffracted from the PVH grating 355 may have the same second circular polarization, e.g. the LCP, as the in-coupled beam 313 impinging upon the PVH grating 355. In FIG. 3, the output beam 315 is schematically shown with a single arrow, but may include a plurality of laterally offset beam replicas as described above, which arise from consecutive diffractions of the in-coupled beam 313 by the PVH grating 355. The reflective display panel 340 reflects a spatially-modulated portion of the output light 315, i.e. image light 317, toward the projection lens 37 disposed opposite the display panel 340 at the other side of the waveguide 200A. The reflection from the display panel 340 changes the handedness of the circular polarization of incident light, so that the image light 317 has the first circular polarization, e.g. is the RCP light, for which the output PVH grating 355 is substantially transparent. Therefore the image light 317 is transmitted through the output PVH grating 355 toward the projection lens 370 substantially without diffraction. The projection lens 370 may be configured to project the image light 317 onto a screen or into an eye of a viewer (not shown). The projection lens 370 may function as an ocular lens in embodiments where the display apparatus 300 is a NED.

The output PVH grating 355 may let some of the incident in-coupled light 313 to leak through it out of the waveguide, resulting in leakage light 319. Furthermore, light diffracted from the PVH grating 355 toward the display panel 340 may be reflected from an interface 353 between the PVH grating 355 and the substrate 210, adding to the leakage light 319. The leakage light 319 mixes with the image light 317, reducing image contrast available to a viewer. Furthermore, we found that the image contrast may oscillate as a function of the PVH thickness 333 $h$.

Referring to FIG. 4, the contrast oscillations may result from interference between a portion 316 of the incident beam 313 that is diffracted forward, e.g. in the first order, toward the top surface 212, i.e. toward the lens 370 in FIG. 3, ("path 1 leakage"), and a portion 318 of the output beam 315 that is reflected back at the PVH/substrate interface 353 ("path 2 leakage"). The portion 316 may correspond to the −1 order of transmitted diffraction, and the portion 318 may corresponds to the −1 order of reflected diffraction. Here, the "transmitted" or "diffracted" order is related to the y-axis direction, i.e. normal to the waveguide plane (x,z), with negative orders referring to the projection of the direction of propagation of the diffracted light that is opposite to the y-axis direction. When the PVH thickness h 333 changes, the interference between the "path 1 leakage" and "path 2 leakage" may result in the image contrast oscillating with a period $\Delta h = \lambda/(2n_{eff})$, where $\lambda$ is the wavelength of input light and $n_{eff}$ is the effective index of refraction of the PVH grating in the direction of propagation of the in-coupled light. FIG. 4 illustrates an embodiment wherein the PVH grating 355 is sandwiched between two portions or layers of the substrate 210 by way of example, with the substrate-PVH interfaces 351 and 353, but the described mechanism remains substantially the same when the PVH grating 355 is located at one of the outer surfaces 212, 214 of the substrate 210, e.g. as illustrated in FIG. 3.

Figure 5:
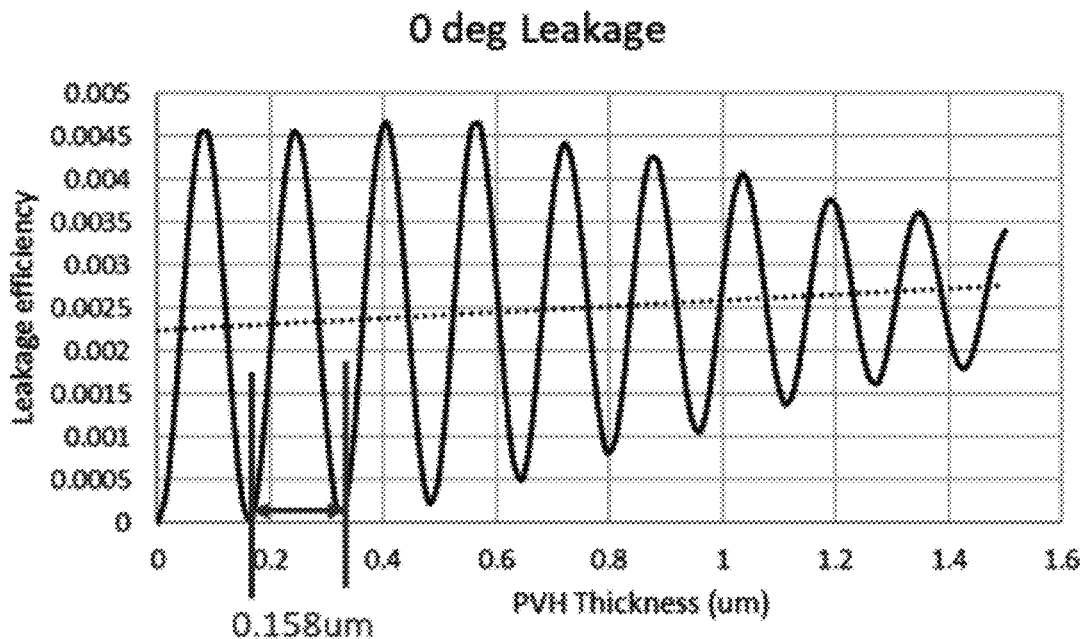
FIG. 5 is a graph illustrating oscillating leakage efficiency as a function of PVH thickness according to example simulations.

FIG. 5 shows a simulated leakage efficiency vs. the PVH thickness 333 $h$, for an embodiment where the output beam 315 is at normal incidence. Here "leakage efficiency" refers to the ratio of the energy of the leakage light 319 to the energy of the in-coupled light 313 incident upon the PVH grating. In this simulation example, the substrate material above and below the PVH grating is glass having a refractive indexes of 1.8, and the PVH grating is formed of a helically-structured birefringent material with $n_e$=1.75, $n_o$=1.55. The angle of incidence of the in-coupled light within the substrate is approximately 46 degrees. The grating period of the PVH grating is approximately 0.4 micrometer (μm), with the slant angle φ approximately (−64) degrees. The incident light is LCP light having a wavelength $\lambda$=0.515 μm. The leakage efficiency oscillates as a function of the thickness h 333 of the PVH grating 355 due to the interference between the leakage light 316 (path 1) and 318 (path 2), with the oscillation period being Δh 0.158 μm in this example.

The leakage from path 1 may be reduced by using a PVH material with lower birefringence $\Delta n=|n_e-n_o|$, and hence a lower effective refractive index modulation for the circular polarized light of the "diffracting" handedness. Example estimations show that for an embodiment where a PVH is embedded in a glass substrate having a refractive index $n_{sub}=1.8$, the peak leakage may be reduced from about 0.45% for a PVH material having $n_e=1.75$, $n_o=1.55$, and $\Delta n=0.2$, to about 0.13% for a PVH material having $n_e=1.65$, $n_o=1.55$, $\Delta n=0.1$, and a relatively thin PVH. However, lowering $\Delta n$ may also reduce the angular bandwidth of the grating's output efficiency, thereby negatively impacting the waveguide's efficiency and uniformity across its field of view (FOV).

The PVH-related leakage of light may also be reduced by gradually, e.g. continuously or step-wise, reducing the birefringence $\Delta n$ in the PVH grating toward its interface, or interfaces, with the substrate. The leakage reduction may be achieved in such embodiments substantially without a reduction, or with a smaller reduction, of the angular bandwidth of efficient output as compared to PVH gratings with uniform $\Delta n$. The birefringence $\Delta n$ of a PVH may be varied by, for example using layers of different PVH materials with differing $\Delta n$, or by over-exposing selected PVH layers to break the alignment of the PVH.

Figure 6:
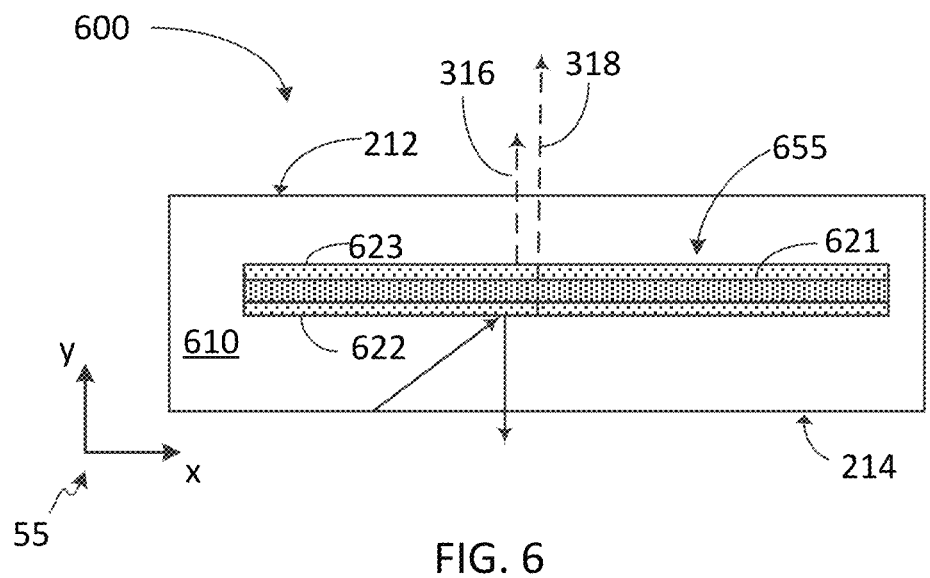
FIG. 6 is a schematic side cross-sectional view of an output portion of an optical waveguide including a multi-layer PVH grating.
Figure 7:
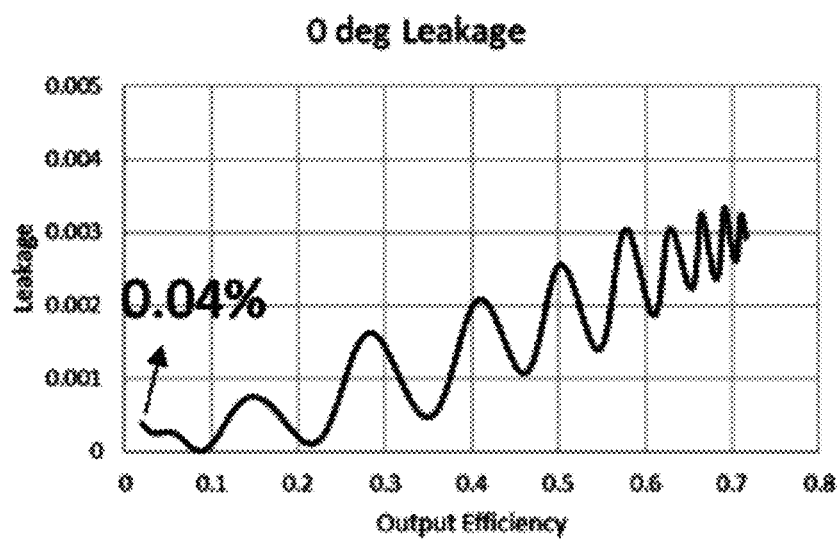
FIG. 7 is a graph illustrating oscillating leakage efficiency as a function of output efficiency for the multi-layer PVH grating of FIG. 6 according to example simulations.

FIG. 6 illustrates a portion of an example substrate 610 of an optical waveguide 600 having a PVH grating 655 that include a stack of at least two PVH layers configured to reduce reflections on at least one PVH/grating interface. In the illustrated embodiment the PVH grating 655 includes three PVH layers 621, 622, and 623. Here a middle PVH layer 621 having a first birefringence $\Delta n_1$ is sandwiched between two outer PVH layers of smaller birefringence, i.e. a second PVH layer 622 having a second birefringence $\Delta n_2 < \Delta n_1$ and a third PVH layer 623 having a third birefringence $\Delta n_3 < \Delta n_1$. In some embodiments the second and third birefringence may be equal, $\Delta n_2 = \Delta n_3 < \Delta n_1$. Each of the PVH layers 621-623 may be embodied as described above with reference to FIGS. 1A and 1B. In some embodiments, the difference in birefringence between a middle PVH layer and an outer PVH layer of the PVH grating may be at most 0.5, or at most 0.75. In some embodiments the difference in birefringence between the layers may be at least 0.01, or at least 0.05, or at least 0.1. By way of example, for an embodiment of PVH grating 655 in which the middle PVH layer 621 has a thickness $h_1$ up to about 1.6 μm, $n_e=1.75$, $n_o=1.55$, and $\Delta n=0.2$, and the two outer PVH layers 622, 623 having each a thickness $h_2$ of about 0.1 μm, $n_e=1.65$, $n_o=1.55$, and $\Delta n=0.1$, the leakage may be reduced to 0.04% or lower for a thin PVH grating having a relatively low output efficiency of about or less than 10%, as illustrated in FIG. 7.

Figure 8:
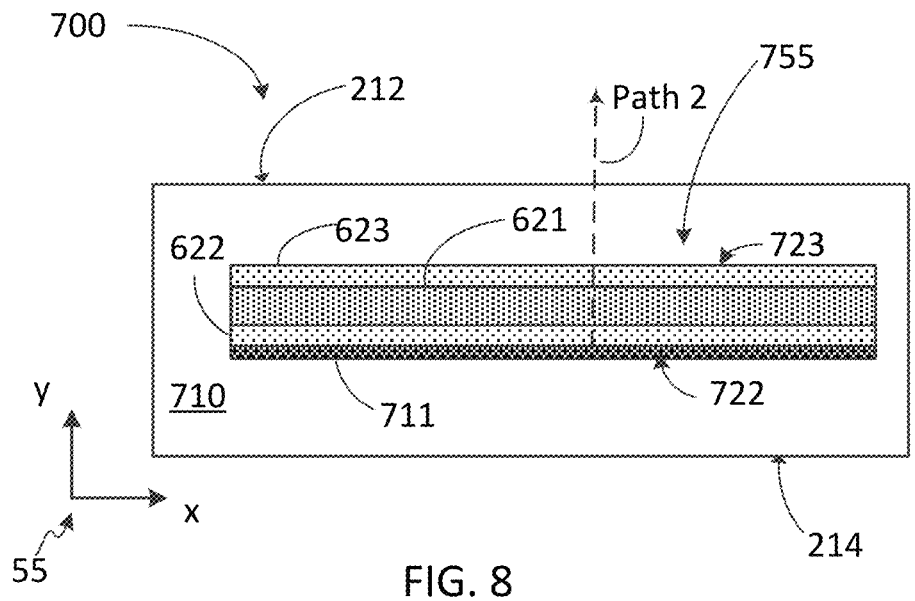
FIG. 8 is a schematic side cross-sectional view of an output portion of an optical waveguide including a multi-layer PVH grating with an AR coating at an interface with the substrate.
Figure 9:
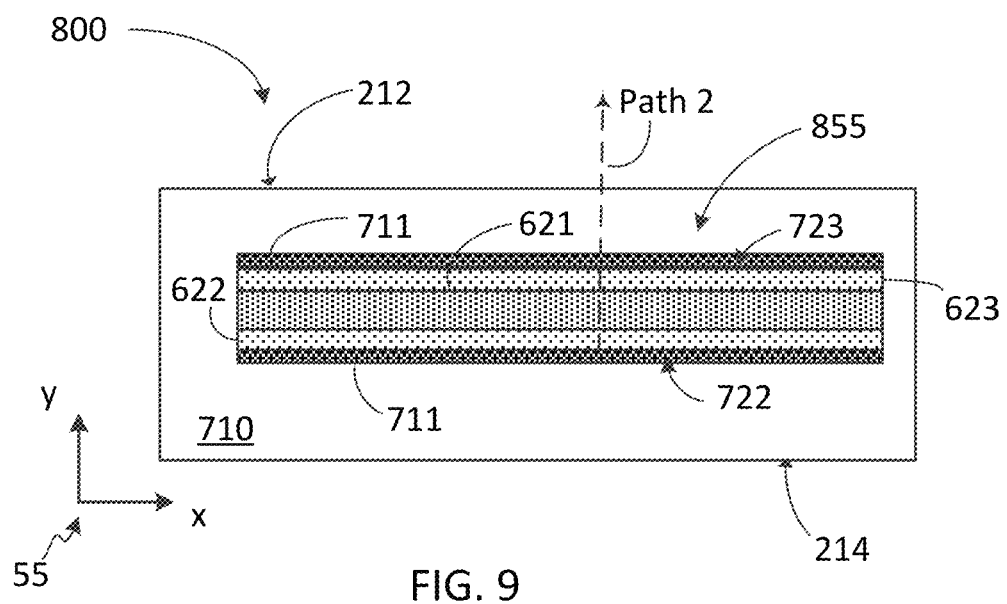
FIG. 9 is a schematic side cross-sectional view of an output portion of an optical waveguide including a multi-layer PVH grating with AR coatings at two interfaces with the substrate.

FIG. 8 illustrates a portion of an example substrate 710 of an optical waveguide 700 having a PVH grating 755 that include the stack of three PVH layers 621-623 as described above, and further including an anti-reflection (AR) coating 711 at one of the PVH/grating interface, e.g. the interface 722 relating to path 2 of the leakage. The AR coating 711 may have a refractive index in-between the substrate refractive index and, e.g. the extraordinary index $n_e$ of the adjacent outer layer 622. The presence of the AR coating 711 may reduce reflections at the PVH/grating interface 722, and therefore may reduce the leakage peaks, at least for relatively thick PVH gratings having relatively high output efficiency. By way of example, the AR coating 711 of the PVH grating 755 may have a refractive index of about 1.68-1.69, and have a thickness of about 0.076 μm, for the example parameters of the PVH layers 621-623 described above and the substrate refractive index of 1.8. In this example, the presence of the AR coating 711 may reduce the leakage efficiency to below 0.1% in a broad range of PVH thickness, and below 0.05% for relatively thick PVH gratings with the output efficiency in the 25%-70% range and above. FIG. 9 illustrates a waveguide 800, which may be an embodiment of the waveguide 700 having a PVH grating 855 with AR coatings 711 at both PVH/grating interfaces. The PVH grating 855 may be an embodiment of the PVH grating 755 and may include substantially same PVH layers 621-623, as described above.

The image contrast to a viewer is defined by the output efficiency, i.e. the fraction of the in-coupled light diffracted by the PVH grating and converted to the image light, divided by the leakage efficiency. In order to maximize the contrast, it may be desirable to select the PVH thickness near minima of the leakage efficiency curve, e.g. as illustrated in FIG. 5 or 7. However, it may also be desirable to vary the output efficiency of the PVH grating along the light path (x-axis) in order to provide image uniformity. It is typically desirable that consecutive diffractions of the in-coupled light at the PVH grating produce output light portions of the same intensity; e.g., referring to FIG. 2B, the PVH grating 255 may be configured so that the output light portions 215 diffracted by the PVH grating 255 at consecutive interactions with the in-coupled light are of the same intensity. Thus, the PBH grating may be configured to have its output efficiency, and hence the thickness, increasing along the optical path of the in-coupled light, i.e. along the x-axis in FIGS. 2A, 2B, and 3. By way of example, in-coupled light propagating in the substrate at about 46° propagation angle may experience about 14 diffracting interactions with the output PVH grating that is about 30 mm long. In order to equalize the diffracted energy at each interaction, the diffraction efficiencies at consecutive diffractions would be, approximately, 0.064, 0.069, 0.075, 0.082, 0.09, 0.1, 0.112, 0.128, 0.15, 0.18, 0.225, 0.3, 0.45, 0.9. Estimations show that a properly designed PVH grating 755 may support image contrast in excess of 200, while a single-layer PVH grating with $\Delta n=0.2$ in a substrate with $n=1.8$ would provide a contrast as low. Various designs of the PVH grating 755 may be chosen in a trade-off between leakage, output efficiency, and spatial uniformity of the output light.

Figure 10:
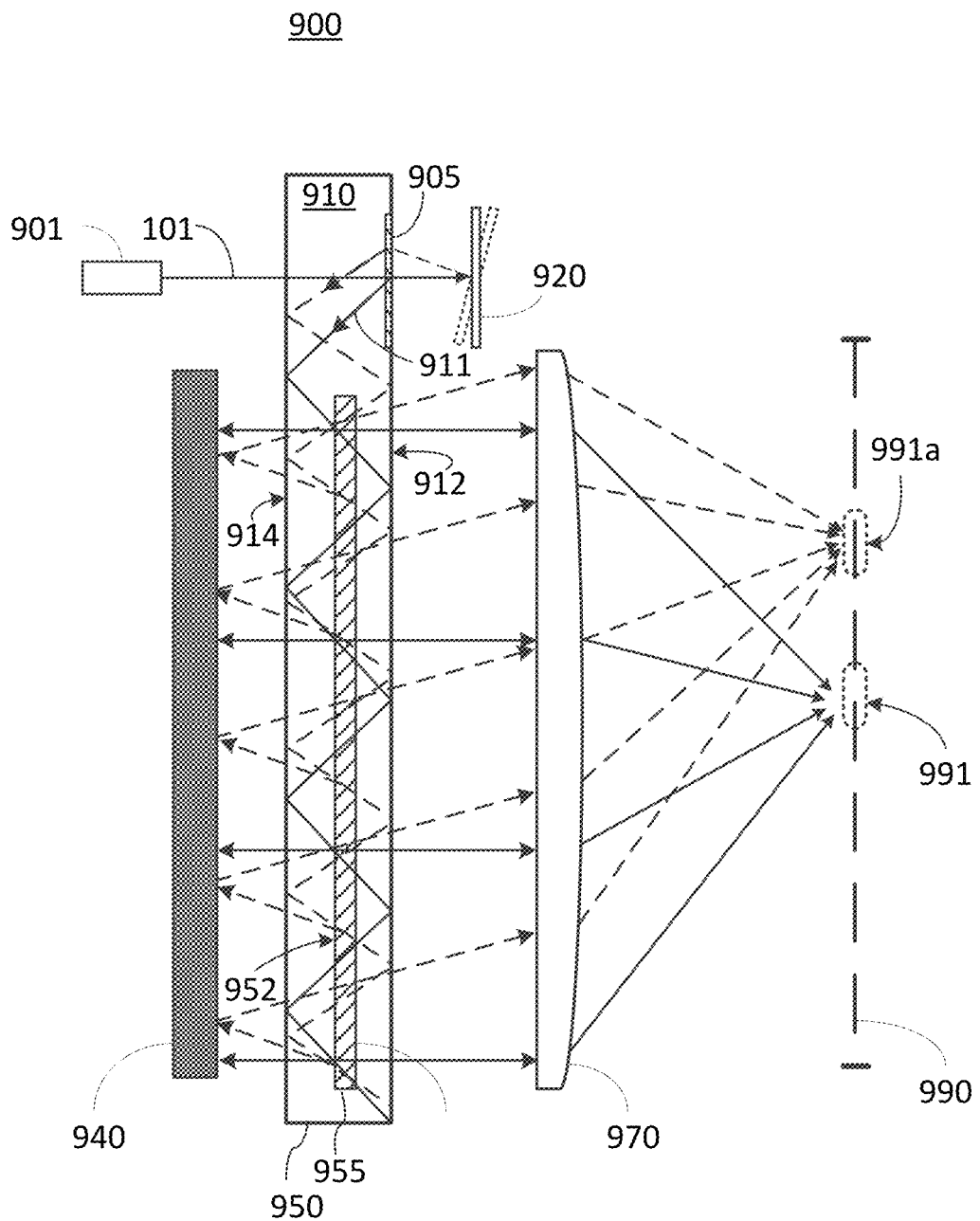
FIG. 10 is a schematic side view of a scanning-pupil display apparatus using PVH gratings in an input and output regions of an optical waveguide for relaying an angularly scanned beam of light to a display panel.

FIG. 10 schematically illustrates a display apparatus 900 utilizing a steering reflector 920, an optical waveguide 950, a display panel 940, and a projection lens 970 to implement a display with a steered output pupil 991. The display apparatus 900 may be for example a near-eye display (NED). The display panel 940 may be, for example, a reflective active-matrix LCOS (liquid crystal on silicon) display panel using a liquid-crystal (LC) layer on top of a silicon backplane, or a DLP (digital light processing) panel having a 2D array of tiltable micro-mirrors. The reflective display panel 940 reflects a spatially-modulated portion of light incident thereon, termed image light, toward the projection lens 970 disposed opposite the display panel 940 at the other side of the optical waveguide 950. The projection lens 970 may be configured to project the image light onto a screen or into an eye of a viewer (not shown). The projection lens 970 may function as an ocular lens in embodiments where the display apparatus 900 is a NED, projecting the image light onto an eyebox 990.

The optical waveguide 950 may be an embodiment of the optical waveguides 200, 200A, 600, 700, or 800 described above. The optical waveguide 950 has a substrate 910 of an optically transparent material. The substrate 910 incorporates an input coupler 905 and an output coupler 955, at least one of which embodied with a PVH grating. The substrate 910 may be made e.g. of a high-index glass or other suitable optically transparent material, preferably with an index of refraction in the 1.5-2.0 range or greater. The waveguide 950 may further include a folding grating, an a-plate, a beam splitter, or some combination thereof, as described above, which are not shown in FIG. 10 to avoid clatter. A light source 901 may be provided opposite of the steering reflector 920, with an input region of the substrate 910 including the input coupler 905 positioned between them. The light source 901 may be embodied, for example, with a laser diode (LD), or two or more LDs which may be of different colors, e.g. red, green, and blue. The light source 901 may also include beam-shaping optics at its output. In some embodiments the light source 901 may also include an output polarizer, e.g. a linear polarizer, or a waveplate, e.g. a quarter-wave plate (QWP), or some combination thereof. The steering reflector 920 may be, for example, a micromirror, e.g. a micro-electro-mechanical system (MEMS) mirror.

In one embodiment, the light source 901 may be configured to emit a beam 101 of light of a first circular polarization (CP), e.g. LCP light, toward the steering reflector 920. The light source 901 may include a quarter-wave plate (QWP) to transform linearly polarized light from an LD to the desired circular polarization. The input coupler 905 may be a PVH grating configured to transmit light of the first circular polarization, e.g. LCP light, and to diffract light of the second circular polarization having the opposite handedness, e.g. RCP light. Upon reflecting from the steering reflector 920, the beam 101 changes its polarization to the orthogonal one, e.g. from LCP light to RCP light, and propagates back toward the input coupler as a steered beam 911. The input coupler 905 diffracts the steered beam 911 to propagate within the substrate 910 by means of TIR at its opposing outer surfaces, as described above and as schematically illustrated in FIG. 10 by the solid and dashed zigzag lines. At each TIR, the steered beam 911 changes the handedness of its polarization, which is restored after an even number of reflections; for example, at each bounce the steered beam 911 may be LCP beam when propagating away from the display panel 940, and may be RCP beam when propagating toward the display panel 940.

After reaching the output region of the substrate, the steered beam 911 repeatedly impinges upon the output coupler 955 after each reflection from the outer surfaces 912, 914, producing a sequence of laterally offset beam replicas, as described above. When embodied with a suitably designed PVH grating, the output coupler 955 may diffract the steered beam 911 out of the substrate 910 toward the display panel 940 each time the steered beam 911 impinges thereon from an input side 952 of the PVH grating 955, i.e. the side of the of the PVH grating 955, or the PVH-substrate interface, that faces the display panel 940. The successive diffractions of the steered beam 911 from the PVH grating 955 produce a sequence of beam replicas that impinge upon the display panel 940. The beam replicas are then reflected from the display panel 940 in an orthogonal circular polarization state, which allows them to be transmitted through the PVH grating 955 approximately without diffraction. The PVH grating 955 may be embodied as described above with reference to FIG. 1A, 1B, 4, 6, 8, or 9. In some embodiments, the PVH grating 955 may be a graded-birefringence multi-layer PVH grating as described above with reference to FIG. 6, 8, or 9.

The input and output PVH gratings 905, 955 may be configured to diffract circular polarized light of opposite handedness. For example, input PVH grating 905 may be configured to diffract light of a first CP, e.g. LCP light, and to transmit light of a second CP, e.g. RCP light, while the output PVH grating 955 may be configured to diffract light of the second CP, e.g. RCP light, and to transmit light of the first CP, e.g. LCP light. In other embodiments, the input and output PVH gratings 905, 955 are configured to diffract circular polarized light of the same handedness, for example where the input PVH grating 905 is disposed at the outer surface 914 of the substrate 910 facing the display panel 940.

The scanning reflector 920, e.g. a tilting mirror, may be operable to angularly scan the beam 911 in some angular range, thereby varying the angle of incidence at which the beam 911, or a chief ray thereof, impinges upon the input coupler 905 after reflection from reflector 920. The angle of incidence of the scanned beam 911, or a chief ray thereof, upon the substrate 910 determines the position of the steered pupil 991 in the eyebox 990 of the display. In FIG. 10, the trajectories of a chief ray of the beam 911 in the substrate 910 are illustrated by way of example for two different scan angles. The solid lines correspond to the normal incidence upon the waveguide, which may correspond to the position of the steered pupil 991 in a central region of the eyebox 990. The dashed line corresponding to an oblique incidence of the chief ray of the steered beam 911 upon the input coupler 905, resulting in a correspondingly oblique incidence of the beam replicas upon the reflective display panel 940, and a shift of the steered pupil 991 closer to a new position 991a, e.g. closer to an edge of the eyebox 990.

The steered beam 911 may diverge so as to illuminate the display panel 940 by a plurality of illumination cones, each being a lower-intensity replica of the steered beam 911. The display apparatus 900 may be designed so that for each steering angle the illumination cones converge onto a same scanned pupil 991, under-filling the eyebox 990, which enables directing the image light into the eye of a viewer more efficiently, with better angular resolution and with fewer aberrations. In some embodiments, the display apparatus 900 may be provided with an eye tracking system (not shown). Furthermore, compared to an emission display, the illumination system of the display apparatus 900 enables the use of narrow-band light sources, such as e.g. LDs, which may improve the color gamut, lessen effects of chromatic dispersion on resolution, and enable the use of narrow-band diffractive optical elements. Additionally the use of PVH gratings, and multi-layer graded-index PVH gratings as out-couplers, may allow providing better image contrast and fewer ghost images by eliminating, or at least reducing, spurious reflections and undesired diffraction orders.

Figure 11A:
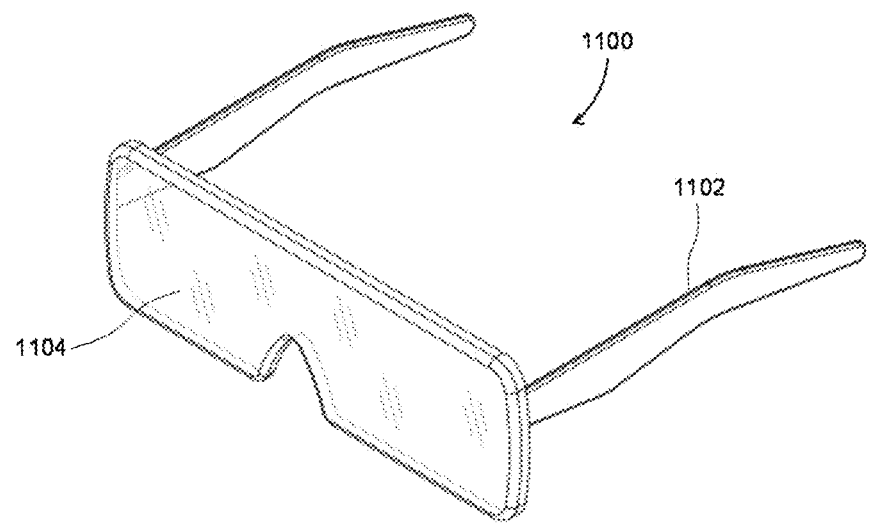
FIG. 11A is an isometric view of an eyeglasses form factor near-eye AR/VR display incorporating a waveguide of the present disclosure.
Figure 11B:
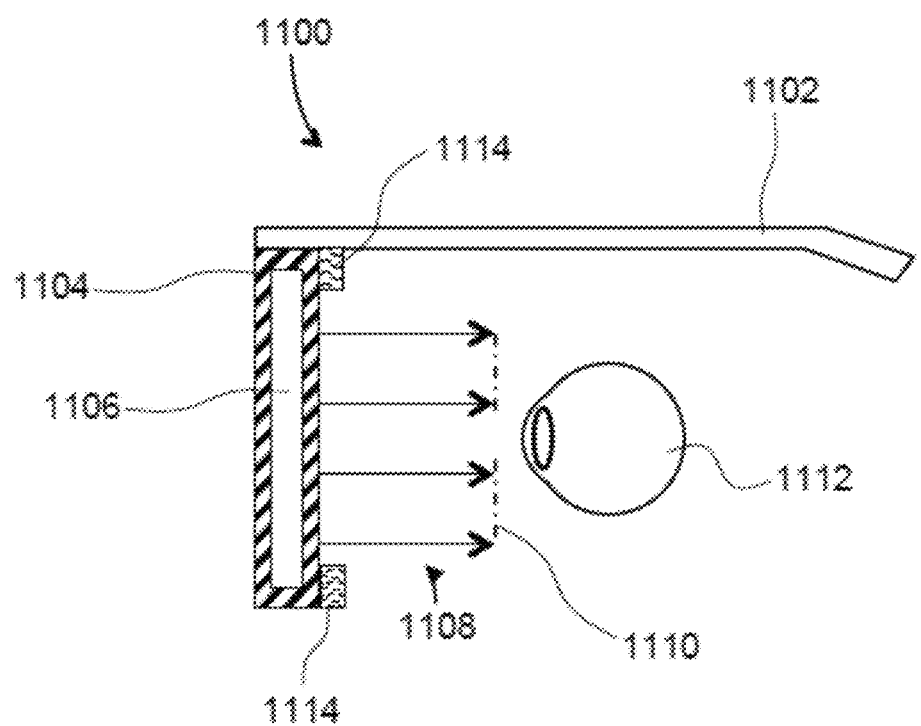
FIG. 11B is a side cross-sectional view of the display of FIG. 11A.

Referring to FIGS. 11A and 11B, a near-eye AR/VR display 1100 includes a body or frame 1102 having a form factor of a pair of eyeglasses. A display 1104 includes a pupil-replicating waveguide 1106 (FIG. 11B), which provides image light 1108 to an eyebox 1110, i.e. a geometrical area where a good-quality image may be presented to a user's eye 1112. The pupil-replicating waveguide 1106 may include any of the waveguides described herein, i.e. the waveguide 200 of FIGS. 2A and 2B, 3 and 4, the waveguide 200A of FIG. 3, and the waveguides illustrated in FIG. 4, 6, 8, or 9.

An image light source of the near-eye AR/VR display 1100 may include, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The near-eye AR/VR display 1100 may further include an eye-tracking system 1114 for determining, in real time, the gaze direction and/or the vergence angle of the user's eyes 1112. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. Yet furthermore, the near-eye AR/VR display 1100 may include an audio system, such as a set of small speakers or headphones.

Figure 12:
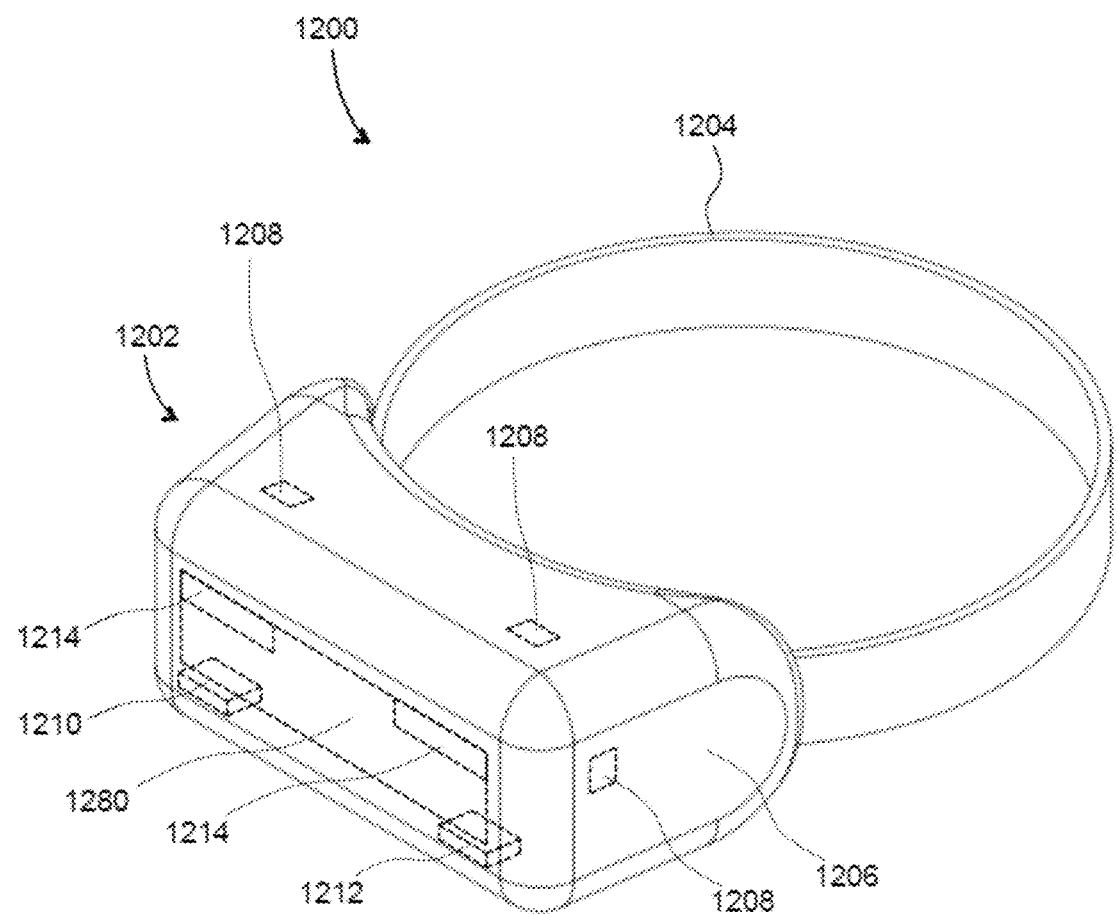
FIG. 12 is an isometric view of a head-mounted display (HMD) incorporating a waveguide of the present disclosure.

Turning now to FIG. 12, an HMD 1200 is an example of an AR/VR wearable display system enclosing user's eyes, for a greater degree of immersion into the AR/VR environment. The HMD 1200 may be a part of an AR/VR system including a user position and orientation tracking system, an external camera, a gesture recognition system, control means for providing user input and controls to the system, and a central console for storing software programs and other data for interacting with the user for interacting with the AR/VR environment. The function of the HMD 1200 is to augment views of a physical, real-world environment with computer-generated imagery, and/or to generate entirely virtual 3D imagery. The HMD 1200 may include a front body 1202 and a band 1204. The front body 1202 is configured for placement in front of eyes of the user in a reliable and comfortable manner, and the band 1204 may be stretched to secure the front body 1202 on the user's head. A display system 1280 may include any of the pupil-replication waveguides described herein. The display system 1280 may be disposed in the front body 1202 for presenting AR/VR images to the user. Sides 1206 of the front body 1202 may be opaque or transparent.

In some embodiments, the front body 1202 includes locators 1208, an inertial measurement unit (IMU) 1210 for tracking acceleration of the HMD 1200, and position sensors 1212 for tracking position of the HMD 1200. The locators 1208 are traced by an external imaging device of a virtual reality system, such that the virtual reality system can track the location and orientation of the HMD 1200. Information generated by the IMU and the position sensors 1212 may be compared with the position and orientation obtained by tracking the locators 1208, for improved tracking of position and orientation of the HMD 1200. Accurate position and orientation is important for presenting appropriate virtual scenery to the user as the latter moves and turns in 3D space.

The HMD 1200 may further include an eye tracking system 1214, which determines orientation and position of user's eyes in real time. The obtained position and orientation of the eyes allows the HMD 1200 to determine the gaze direction of the user and to adjust the image generated by the display system 1280 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1202.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Other various embodiments and modifications, in addition to those described herein, will be apparent to those of ordinary skill in the art from the foregoing description and accompanying drawings. Such embodiments and modifications are intended to fall within the scope of the present disclosure. Furthermore, elements or features described with reference to a particular embodiment may be used in other embodiments. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth of the present disclosure as described herein.

What is claimed is:

1. An optical waveguide comprising:
   a substrate of optically transparent material comprising two opposing outer surfaces for guiding a beam of light in the substrate by reflections therefrom; and
   a polarization volume hologram (PVH) grating disposed in or upon the substrate, the PVH grating comprising a stack of PVH layers, at least one PVH layer of the stack comprising a periodic sequence of helically-birefringent fringes, wherein adjacent PVH layers of the stack have different birefringence;
   wherein the PVH grating is configured to:
   transmit therethrough light of a first polarization while diffracting light of a second, orthogonal polarization; and
   diffract out of the substrate a portion of the beam having the second polarization.

2. The optical waveguide of claim 1 wherein the first and second polarizations are circular polarizations of opposite handedness.

3. The optical waveguide of claim 2 wherein the substrate further comprises an input region for coupling the beam into the substrate, and an output region at a distance from the input region for coupling the beam out of the substrate to form an output beam; wherein the PVH grating is disposed in at least one of the input or output regions.

4. The optical waveguide of claim 3 wherein the PVH grating is disposed in the output region.

5. The optical waveguide of claim 1 wherein the stack of PVH layers comprises a first PVH layer between second and third PVH layers, the first PVH layer having a higher birefringence than the second and third PVH layers.

6. The optical waveguide of claim 5 comprising an anti-reflection (AR) coating at an interface between the PVH grating and the substrate.

7. The optical waveguide of claim 5 wherein the PVH grating extends across the output region along the two opposing outer surfaces.

8. The optical waveguide of claim 7 wherein the PVH grating is configured to have an increasing diffraction efficiency in a direction of propagation of the beam across the output region.

9. The optical waveguide of claim 5 comprising a folding grating disposed in the substrate in an optical path of the beam from the input region to the output region.

10. The optical waveguide of claim 9 comprising a beam splitter disposed in the substrate in the optical path of the beam.

11. The optical waveguide of claim 5 comprising an a-plate retarder disposed in the substrate in an optical path of the beam.

12. A display apparatus comprising:
a display panel; and
an illuminator for the display panel, the illuminator comprising:
 a light source for emitting a beam of light; and
 an optical waveguide for relaying the beam to illuminate the display panel, the optical waveguide comprising:
  a substrate of optically transparent material, the substrate comprising:
   an input region for coupling the beam into the substrate, and an output region at a distance from the input region for coupling the beam out of the substrate to form an output beam;
  two opposing outer surfaces for guiding the beam in the substrate by reflections therefrom; and
  a first polarization volume hologram (PVH) grating comprising a periodic sequence of helically birefringent fringes and configured to diffract light having a first circular polarization while transmitting therethrough light of a second circular polarization of opposite handedness;
  wherein the first PVH grating extends along the outer surfaces in the output region to diffract out of the substrate, as the output beam, a portion of the beam incident thereon having the first circular polarization, the first PVH grating comprising a stack of PVH layers, each PVH layer of the stack comprising a periodic sequence of helically birefringent fringes, the stack comprising a middle PVH layer between two outer PVH layers, the middle PVH layer having a greater birefringence than the outer PVH layers.

13. The display apparatus of claim 12 further comprising a projection lens disposed opposite the display panel with the output region of the optical waveguide therebetween, wherein the display panel is configured to reflect at least a portion of the output light toward the projection lens as image light, and wherein the first PVH grating is configured to transmit therethrough the image light to propagate to the projection lens.

14. The display apparatus of claim 13 comprising a steering reflector configured to direct the beam from the light source toward the input region at a variable angle of incidence.

15. The display apparatus of claim 14 comprising a second PVH grating configured to transmit light of one of the first and second circular polarizations and to diffract light of the other of the first and second circular polarizations, the second PVH grating disposed in the input region between the light source and the steering reflector, the light source configured to emit circularly polarized light of the one of the first and second circular polarizations.

16. A method for illuminating a display panel, the method comprising:
using an optical waveguide to propagate a beam of light toward the display panel;
using a polarization volume hologram (PVH) grating comprising a periodic array of helically birefringent fringes and configured to diffract incident light of a first polarization while transmitting incident light of a second, orthogonal polarization, to perform at least one of: coupling the beam into the optical waveguide or out of the optical waveguide; and
using a birefringence-graded stack of PVH layers in the PVH grating, the stack comprising an inner PVH layer between two outer PVH layers of lower birefringence, to lessen leakage of light of the first polarization through the PVH grating.

17. The method of claim 16, comprising using a first PVH grating in an input region of the optical waveguide to transmit circularly polarized light therethrough from an optical source to a steering reflector, and using a second, graded-birefringence PVH grating disposed in an output region of the optical waveguide to diffract light out of the waveguide toward a reflective display panel, and to transmit light reflected from the reflective display panel toward a projection lens disposed opposite the reflective display panel.

* * * * *